Figure 1:
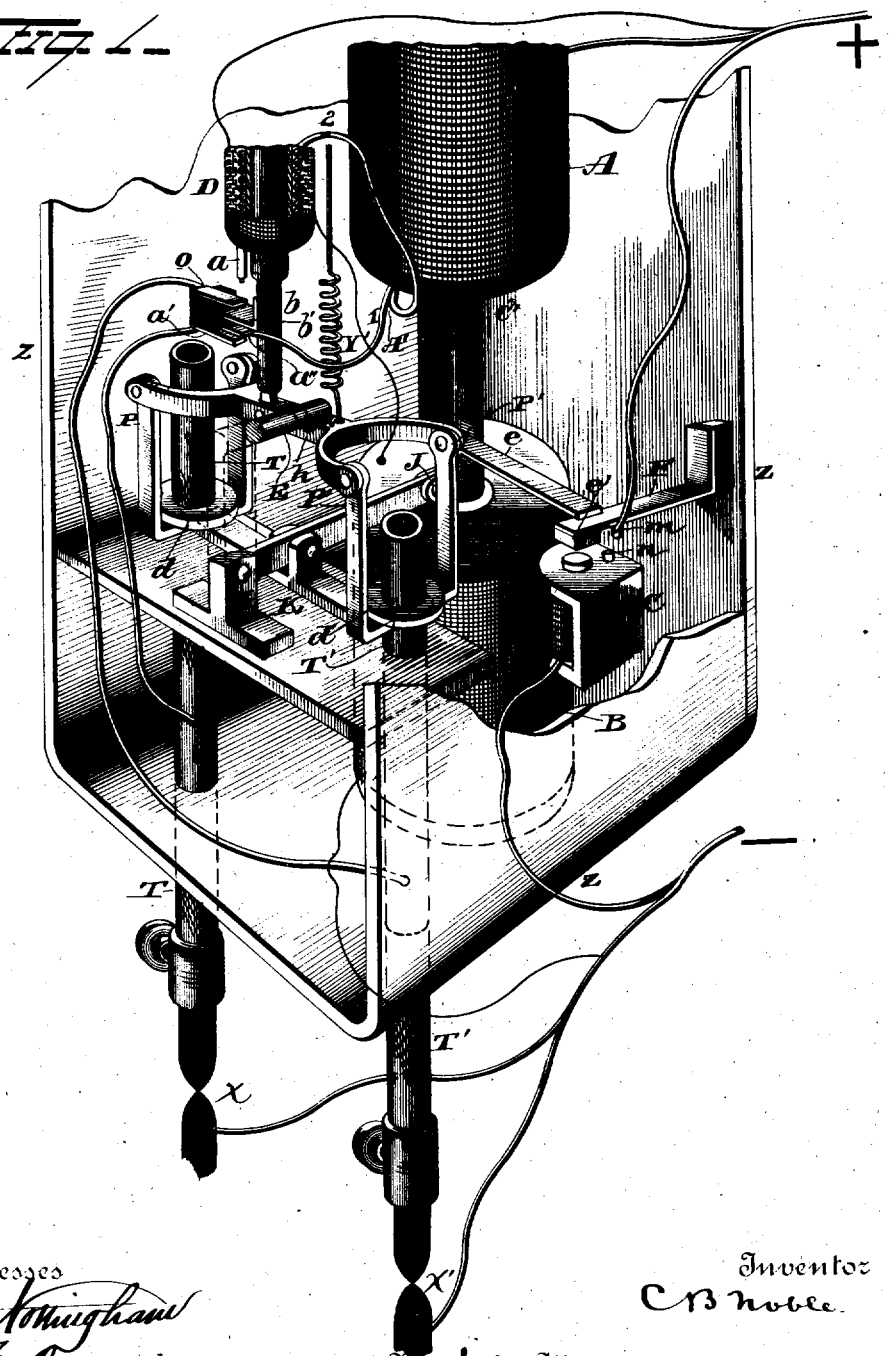

2 Sheets—Sheet 1.

C. B. NOBLE.

ELECTRIC ARC LAMP.

No. 11,002. Reissued May 7, 1889.

Witnesses
E. J. Nottingham
G. F. Downing

Inventor
C B Noble

By his Attorney
K A Simmons

C. B. NOBLE.
ELECTRIC ARC LAMP.
No. 11,002. Reissued May 7, 1889.
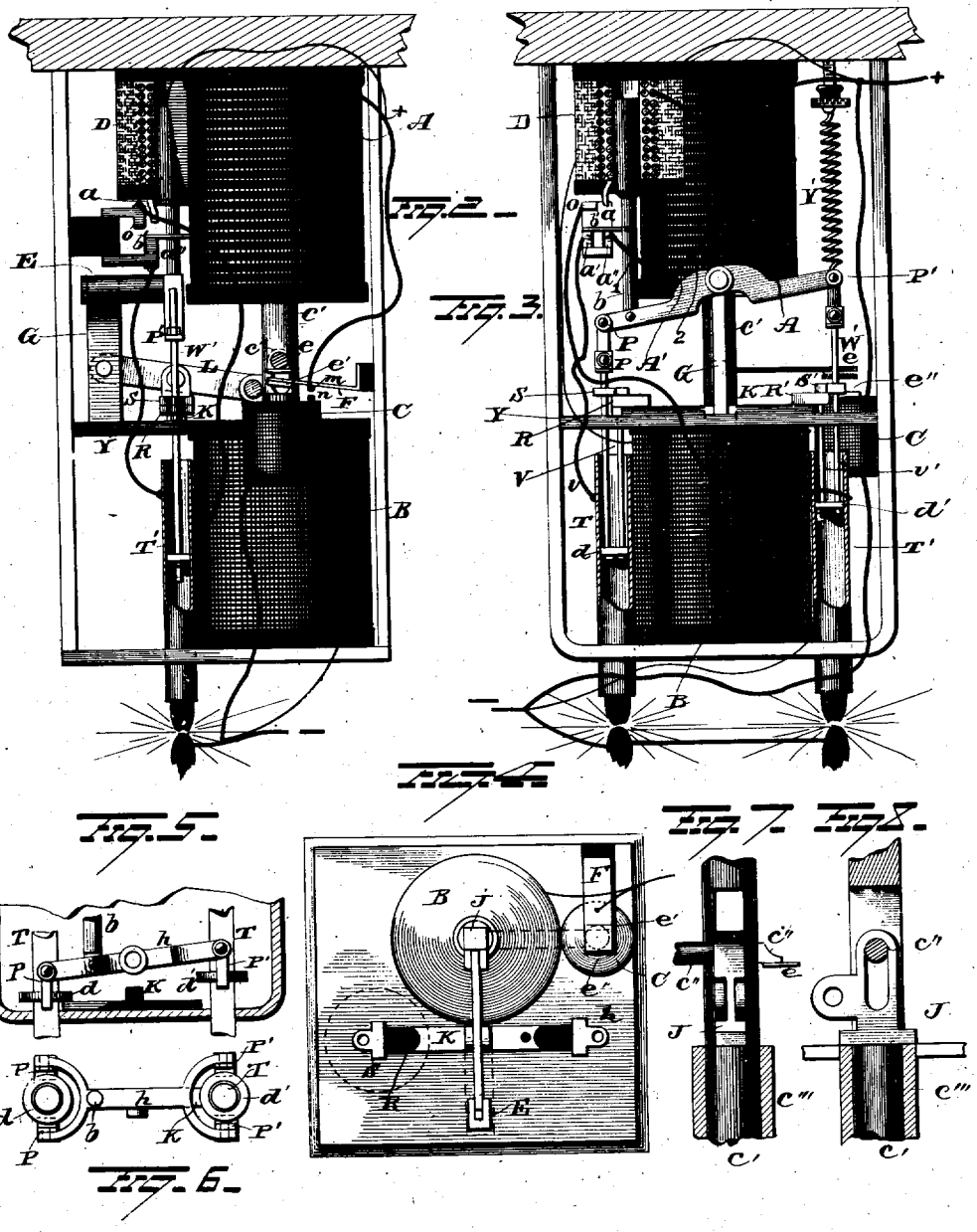
Witnesses
E. A. Nottingham
G. F. Downing
Inventor
C B Noble.
By his Attorney
H A Simmon

UNITED STATES PATENT OFFICE.

CLARENCE B. NOBLE, OF CLEVELAND, OHIO.

ELECTRIC-ARC LAMP.

SPECIFICATION forming part of Reissued Letters Patent No. 11,002, dated May 7, 1889.

Original No. 374,129, dated November 29, 1887. Application for reissue filed February 15, 1889. Serial No. 300,078.

*To all whom it may concern:*

Be it known that I, CLARENCE B. NOBLE, a resident of Cleveland, in the county of Cuyahoga and State of Ohio, have invented certain new and useful Improvements in Electric-Arc Lamps; and I do hereby declare the following to be a full, clear, and exact description of the invention, such as will enable others skilled in the art to which it appertains to make and use the same.

The invention consists in providing improved means for automatically throwing the current from one set of carbons to another when the former has been nearly or quite consumed.

It also consists in furnishing an improved cut-out and covers other details, which will be fully described in the specification, and more particularly pointed out in the claims.

In the accompanying drawings, which illustrate my invention, Figure 1 is a perspective view of the mechanism of my improved lamp, two sides of the casing being removed. Figs. 2 and 3 are respectively side and front elevations of the mechanism. Fig. 4 is a horizontal section; and Figs. 5, 6, 7, and 8 show details.

In this application two different forms of clutch are shown and described. Figs. 1, 5, and 6 show one of them, and Figs. 2, 3, and 4 the other. The clutches are acted upon to feed the rod by substantially the same mechanism in both instances, and the present invention has reference more particularly to this mechanism.

Referring to the drawings by letter, Z is the frame of my lamp, and $x$ and $x'$ are two sets of carbons, forming part thereof.

A and B represent the usual fine and coarse wire magnets, which act differentially on a common core, $c'$. Pivoted to the core and to a standard, G, is a bar, L, to which between its pivots is attached a horizontal bar, K, extending at right angles beneath the said bar L. The ends of the bar in the form of lamp shown in Fig. 1 are located beneath ring-clutches $d$ $d'$ on the carbon rods T T'. The clutches are supported on the ends of hooked links P P', which are suspended from the extremities of U-shaped formations on the ends of a lever, $h$, which latter is pivoted to an extension, E, of the standard G. The lever $h$ is normally tilted, so that one end—say that which supports the clutch $d$—is lower than the other, being under tension from a spring, $y'$, as shown. The construction is such that one end of the bar K rests normally directly under the clutch $d$, while the other end is considerably below the clutch $d'$. As a consequence only the rod T will be acted on when the bar K is lifted to establish the arc. It will be understood that the hooked link P supports the ring-clutch in a horizontal position, and that a tilting of the clutch to grasp the carbon rod takes place when the bar strikes against the clutch.

In Figs. 2, 3, and 4 I show a different kind of a clutch, being identical with one for which I received a patent numbered 346,217, and dated July 27, 1886. In this construction the clutch $d$ consists of a disk located within the hollow carbon rod, and supported by two rods or wires, $w$ and $v$. The rod $w$, in this instance, is connected loosely to the disk, and the rod $v$ is bent at the lower end and hooks into a slot in the disk. The latter is permanently attached to a brass arm, S, which rests upon an insulating-block, R, on the bar K. The wire $w$ passes loosely through the said arm S, which serves to prevent its moving to one side. The lifting of the rod or wire $v$, due to the action of the lamp in establishing the arc, tilts the disk and raises the positive carbon of the $x$ group. The same action has no effect upon the other clutch, (which is constructed in the same manner,) because the disk is held up out of the way of the moving rod, as shown in Fig. 3. The lever $h$ is connected with the movable core $b$ of magnet D. This magnet is wound with both fine and coarse wire, the fine wire being in the same shunt around the arc with magnet B, and the coarse wire forming a part of the main circuit. The core $b$ carries a projection, $b'$, which plays between two pairs of contacts, $a'$ $a''$ and $o$ and $a$. The contact $a$ is the terminal of the coarse-wire coil on magnet D, and the others are pieces separately supported by an insulating-block, as shown.

Referring to Fig. 3, the main circuit enters the lamp at +, and after passing around magnet A branches at A', one branch, 1, going to contact $a''$, and the other 2, to the coarse coil of magnet D. Which course the current takes depends on the position of the strip $b'$ with reference to the contacts, as will be now explained. The normal position of the core $b$ is down. The current in passing through the lamp energizes magnet A, lifts its core, and accordingly the bar K. Bar K tilts the clutch $d$, which grips the rod and causes it to rise and establish the arc. As the carbons are consumed and the resistance becomes greater, more of the current is shunted into magnet B, which operates on the core in the usual way and lowers the bar K, allowing the rod to feed. The course of the current is now as follows: From + through magnet A, out at A′ and along branch 1 to contact $a''$, through strip $b'$ to contact $a'$, to upper carbon, to lower carbon, and to −. When the arc is established, the movement of the bar K is not long enough to impinge against the ring $d'$, and so rod T and the $x$ carbons only are separated. When, however, the carbons are nearly consumed, the resistance increases abnormally and the current in the shunt becomes stronger, until magnet D becomes sufficiently energized to lift its core and lift the strip $b'$ from contacts $a'$ and $a''$. The full current then passes through the shunt-wire, drawing core $b$ up until strip $b'$ makes contact with $o$ and $a$. When this contact is made, the main current then passes over branch wire 2, through coarse coil on magnet D, contact $a$ to strip $b'$, contact $o$ to carbons $x'$, and thence to −. The heavy current now passing through magnet D holds the strip $b'$ against the contacts. The lifting of the core $b$ also causes the tilting of lever $h$ to a horizontal position, so that ring $d'$ is brought within the movement of bar K, and, as $h$ becomes horizontal at the same time core $b$ is elevated, the ring $d'$ will be lowered upon the bar K and be tilted to grip the rod, while the ring $d$ will be lifted away from the bar K. The parts are adjusted so that the point at which this rod is elevated by bar K will be the point at which the arc is established. The $x'$ carbons will now be consumed and fed in the same manner that the $x$ carbons were. The main core $c'$ is slotted, and a block, J, is inserted into the slot and hung on a pin which passes laterally through the core and projects through the side thereof, where it has secured to it an arm, $e$. The block J is also slotted to allow the pin $c''$ to slide within it, and it has an enlarged base, which extends out beyond the core to rest on the head of the magnet B, as will be set forth. The bar L is pivoted to this block. The arm $e$ extends out and over the spring-armature F of a magnet, C, which is secured to any convenient part of the lamp-frame. The armature is insulated, as shown, and has a piece of soft iron, $e'$, secured to its lower face, and is further provided with contact $m$, which engages with contact $n$ on the head of the magnet C, the latter contact being one of the terminals of said magnet. The terminals are in a branch circuit around the lamp from + to −, as shown in Figs. 2 and 3. When the second set of carbons $x'$ are burned out, the resistance becomes excessive and the magnet B draws the core down until the block J rests on top of the spool. Then the core continues to settle and the pin $c''$ to move in the slot of J until arm $e$ forces the spring F down so that contact is made between $m$ and $n$. The lamp is thus cut out or short-circuited, and so long as the current passes through magnet C the armature F will be held down. The magnet D does not act to tilt the lever $h$ until the resistance of the $x$ carbons becomes excessive, owing to the complete or nearly complete exhaustion of the said carbons, or of one of them. Under other conditions the spring Y′ counterbalances the pull of the said magnet. The core $c'$ may be supported on a spring, which can be placed in the hollow core of the magnet B, so that when the carbons are normally feeding the weight of the said core will not cause the arm $e$ to bear down upon the armature F to cut out the lamp—that is, the weight of the core $c'$ is counterbalanced by a suitably-placed spring. During the consumption of the first set of carbons the carbons of the second set are in contact, the upper carbon being supported by the lower, and thus the arc establishing and feeding magnets are relieved of its weight. Similarly while the second set is being consumed the unused stub of the upper carbon of the $x$ set is resting on the lower carbon. In each instance the clutch of the set not in use is raised out of the path of the bar K. It is evident that the contacts $a'$ and $a''$ may be dispensed with, and that the branch 1 may run directly from A′ to the carbon rod T. It is true that in this case there would be a circuit through the first set of carbons, or what remained of them, after the second set began to burn; but the resistance of such circuit would be so great as practically to cut out the first set.

What I claim is—

1. The herein-described mechanism for automatically switching the current from one set of carbons to the other, consisting of the magnet D, carrying a coil of fine wire which is located in a shunt around the arc, and also a coil of coarse wire which is adapted to form a part of the main circuit, the core of said magnet being movable, connected with the tilting lever $h$, and carrying contact-piece $b'$, in combination with two pairs of contacts so arranged that when the piece $b'$ bridges one pair the main current shunts the magnet D, and when it bridges the other pair the main current passes through the said magnet, as set forth.

2. In an electric lamp in which two sets of carbons are operated successively, the combination, with a tilting lever carrying at each end a clutch for operating to feed each set of carbons, of an arm, K, magnet D and its core, and spring Y′, for making operative successively the clutches when they are thrust within its reach by the tilting lever, the motions of the lever being controlled by the partial or entire consumption of a set of carbons, as specified.

3. In an electric lamp, a slotted core for the main and shunt magnets, a slotted block sliding within the slot in the core, a pin passing through the core and a slot in said block, an arm connected with said pin, and a pair of contacts adapted to be brought together by the movement of said arm, the said contacts completing a circuit to cut out the lamp, substantially as described.

4. The combination, in an arc lamp, with the coarse and fine wire magnets for establishing and regulating the length of the arc, of a magnet carrying a coil of coarse and fine wire, the fine wire being in a shunt around the arc and the coarse wire adapted to be thrown in circuit with the second set of carbons, and having a movable core which is attached to one end of a tilting lever, which carries at each end a clutch to feed each set of carbons, and a spring connected to the other end of said lever to counterbalance the pull of the magnet, and an arm extending beneath each clutch to operate successively the clutches when they are lowered upon it by the tilting lever, the motions of the lever being controlled by the partial or entire consumption of a set of carbons, as described.

5. In an electric-arc lamp in which two sets of carbons are burned successively, the combination of arc establishing and regulating magnets, a core movable therein, clutches, an arm actuated by the movable core and extending beneath the clutches, and a device engaging both clutches for holding them, one at a time, out of the way of the arm when the latter moves up to establish the arc.

6. The herein-described mechanism for automatically switching the current from a burned-out set of carbons to an unburned set of carbons, consisting of an independent circuit for each set of carbons, and the arc establishing and regulating mechanism, in combination with a tilting lever carrying at each end a clutch for feeding each set of carbons, a magnet carrying a coil of coarse and fine wire, the fine wire being in a shunt around the arc and the coarse wire adapted to be thrown in circuit with the second set of carbons when the first set has been consumed, the core of said magnet being movable and carrying a contact-piece which plays between two pairs of contacts so arranged that when the said contact-piece bridges one pair the main current passes through the first set of carbons and shunts the said magnet and the second set of carbons, and when the contact-piece bridges the other pair of contacts the main current passes through this magnet and the second set of carbons and shunts the first set of carbons, substantially as set forth.

7. A cut-out for an electric-arc lamp, consisting of the main and shunt arc establishing and regulating magnets, respectively, of a slotted core movable therein, a pin passing through the side thereof, an arm secured to said pin, a slotted block inserted in the slot in the core and hung on said pin, a spring supporting the weight of said core, and a pair of contacts adapted to be brought together to cut out the lamp by the movement of said arm, the movement of said arm being produced when the shunt-magnet increases in strength abnormally, due to the consumption of the carbons in the lamp, substantially as described.

CLARENCE B. NOBLE.

Witnesses:
JANE W. HUTCHINSON,
ELLEN H. B. NOBLE.